United States Patent
Wang et al.

(10) Patent No.: US 8,250,547 B2
(45) Date of Patent: Aug. 21, 2012

(54) FAST IMAGE LOADING MECHANISM IN CELL SPU

(75) Inventors: Wen Jun Wang, Beijing (CN); Xiu Hua Huang, Beijing (CN); Jian Chen, Beijing (CN); Yuan Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 12/196,888

(22) Filed: Aug. 22, 2008

(65) Prior Publication Data

US 2009/0055807 A1 Feb. 26, 2009

(30) Foreign Application Priority Data

Aug. 22, 2007 (CN) .......................... 2007 1 0146588

(51) Int. Cl.
*G06F 9/45* (2006.01)
*G06F 9/00* (2006.01)

(52) U.S. Cl. ......... 717/136; 717/140; 717/149; 712/228

(58) Field of Classification Search .................. 718/100; 713/164
See application file for complete search history.

(56) References Cited

U.S. PATENT DOCUMENTS

| | | | |
|---|---|---|---|
| 5,404,521 A | 4/1995 | Murray | |
| 5,867,704 A * | 2/1999 | Tanaka et al. | 718/105 |
| 2004/0015888 A1* | 1/2004 | Fujii et al. | 717/136 |
| 2005/0022173 A1* | 1/2005 | Kanade | 717/140 |
| 2005/0257200 A1* | 11/2005 | Taylor | 717/136 |
| 2007/0006193 A1* | 1/2007 | Babaian et al. | 717/149 |
| 2007/0043935 A2* | 2/2007 | Kissell | 712/228 |
| 2007/0074207 A1* | 3/2007 | Bates et al. | 718/1 |
| 2007/0074221 A1* | 3/2007 | Stenson et al. | 718/106 |
| 2007/0157199 A1* | 7/2007 | Iwamoto | 718/100 |
| 2007/0169042 A1* | 7/2007 | Janczewski | 717/149 |
| 2007/0234313 A1* | 10/2007 | Teranishi | 717/136 |
| 2008/0077815 A1* | 3/2008 | Kanakogi | 713/322 |
| 2008/0201561 A1* | 8/2008 | Bates et al. | 712/228 |
| 2008/0229291 A1* | 9/2008 | Chen et al. | 717/140 |

OTHER PUBLICATIONS

Brian Flachs, The Microarchitecture of the Synergistic Processor for a Cell Processor, IEEE Journal of Solid-State Circuits, vol. 41, No. 1, Jan. 2006, pp. 63-68.*

Alfredo Buttari, Scop 3, A Rough Guide to Scientific Computing On the PlayStation 3, Technical Report UT-CS-07-595 Version 1.0, Innovative Computing Laboratory University of Tennessee Knoxville, May 11, 2007, pp. 3-8 and 28-46.*

* cited by examiner

*Primary Examiner* — Thuy Dao
*Assistant Examiner* — Mongbao Nguyen
(74) *Attorney, Agent, or Firm* — Suiter Swantz pc llo

(57) ABSTRACT

The present invention provides a method and system for loading and running program images rapidly in a multi-processor system. The method comprises the steps of: starting in a synergistic processor a synergistic processing program listener, which is configured to listen to a notification from a main processor; calling in the main processor a run-synergistic-processing-program function which is configured to notify the synergistic processing program listener to run a synergistic processing program image which is part of the program image and has been transferred to the local store of the synergistic processor; and the synergistic processing program listener running the synergistic processing program image in response to receiving the notification.

20 Claims, 4 Drawing Sheets

FAST IMAGE LOADING MECHANISM IN CELL SPU

CROSS-REFERENCE TO RELATED APPLICATIONS

The present application claims the benefit under 35 U.S.C. §119 of China; Application Serial Number 200710146588.1, filed Aug. 22, 2007 entitled "A FAST IMAGE LOADING MECHANISM IN CELL SPU" which is incorporated herein by reference.

TECHNICAL FIELD

The present invention relates to the computer field, particularly to a Cell Broadband Engine Architecture (CBEA, or informally, "Cell"), and more particularly to a method and system for fast loading and running of program images in a Cell synergistic processor element (Cell SPE).

BACKGROUND

The Cell Broadband Engine Architecture defines a new processor structure based upon the 64-bit Power Architecture technology, but with unique features directed toward distributed processing and media-rich applications. The Cell Broadband Engine architecture defines a single-chip multiprocessor consisting of one or more Power Processing Elements (PPE) and multiple high-performances SIMD Synergistic Processor Elements (SPE).

The IBM Software Development Toolkit (SDK) for Cell Broadband Engine (Cell BE) is a complete package of tools to allow developers to obtain first-hand experience on this revolutionary Cell BE Processor. The SDK is composed of development tool chains, software libraries and sample source code, a system simulator, and a Linux kernel that fully support the capability of the Cell BE.

FIG. 1 is a block diagram of the structure of the Cell Broadband Engine. As shown in FIG. 1, the Cell BE has 1 PPE (PowerPC processor Element) and 8 SPE (Synergistic Processor Element). The PPE is a 64-bit PowerPC Architecture core. It is fully compliant with the 64-bit PowerPC architecture and runs 32-bit and 64-bit operating systems and applications. The SPEs are independent processors, each running its own separate application programs. The PPEs and SPEs communicate with each other through an Element Interconnect Bus (EIB) and communicate with a main storage and I/Os.

FIG. 2 is a block diagram of the structure of the PPE. As shown in the figure, the PPE contains two main components, a Power processing unit (PPU) and a Power Processor Storage Subsystem (PPSS).

FIG. 3 is a block diagram of the structure of the SPE. As shown in the figure, the SPE contains two components, a synergistic processor unit (SPU) and a memory flow controller (MFC). The MFC contains a DMA controller which supports DMA transfer.

The PPU accesses the main storage with load and store instructions that go between a private register file and the main storage. However, the SPUs access the main storage with direct memory access (DMA) commands that go between the main storage and a private local store used to store both instructions and data. SPU instruction-fetches and load and store instructions access this private local store, rather than the shared main storage.

The PPE and SPE communicate through three main communication mechanisms supported by the MFC of each SPE, which are mailboxes, signal notification registers and DMAs. Mailboxes are queues for exchanging 32-bit messages. Two mailboxes are provided for sending messages from the SPE to the PPE, and one mailbox is provided for sending messages from the PPE to the SPE. Signal notification registers are used to send signal notifications to the SPE from the PPE. DMA transfers between the local store of the SPE and the main storage can be initiated by either the SPU of the SPE, or the PPE or another SPE.

Each SPU contains a RISC core, and a 256 KB, software-controlled local store for instructions and data. The SPUs support a special SIMD instruction set, and rely on asynchronous DMA transfers to move data and instructions between the main storage and their local stores.

A PPE program starts a SPE program running by creating a thread on the SPE using, for example, a spe_create_thread call, which calls a SPU runtime management library. The spe_create_thread call loads the program image into the SPE local store (LS), sets up the SPE environment, starts the SPE program, and then returns a pointer to the SPE's new thread ID. These procedures have much overhead. The following shows a exemplary pseudocode of the spe_create_thread:

```
speid_t spe_create_thread(spe_program_handle handle)
{
create a directory called /spu/spe-xxx (xxx is a unique name) to represent
the SPE which will execute the program identified by handle;
    create a file /spu/spe-xxx/mem to represent the local store of the SPE;
create a file /spu/spe-xxx/mbox to represent a mailbox channel to the SPE;
create a file /spu/spe-xxx/sig1 to represent a signal notification channel
1 to the SPE;
create a file /spu/spe-xxx/sig2 to represent a signal notification channel
2 to the SPE;
    write the content of the program into the file /spu/spe-xxx/mem;
set the instruction register of the SPE to point to the beginning of
the program;
    start the SPE which will execute the program.
}
```

In this exemplary spe_create_thread, a directory needs to be created first, and a series of files are created in the directory. Then the content of the program is written into the file /spu/spe-xxx/mem, thus loading the program image into the local store of the SPE. The instruction register of the SPE is set to point to the beginning of the program image, and the SPE is started to execute the program image. Obviously the spe_create_thread is an expensive call, and the PPE will spend much time to set up the environment of the program.

On the other side, the SPE has only a 256 KB local store, so the program image size can not exceed 256 KB. The programmer must take care of the size limit. Therefore, the programmer should divide a large program into separate pieces; each piece is a standalone SPE image. After finishing the execution of one SPE image, the SPE will be released and wait to be called next time. Then the following procedure is repeated:
1. PPU calls spe_create_thread to start a SPE running;
2. SPE runs the program image;
3. After finishing the running, SPE is released.

It can be conceived that, if the program is very huge, PPE needs to call spe_create_thread frequently. The overhead will be very heavy.

Obviously, there exists a demand in the art for speeding up the program image loading and running.

SUMMARY

According to one aspect of the present invention, there is provided a method for loading and running program images rapidly in a multi-processor system, comprising the steps of: starting in a synergistic processor a synergistic processing program listener, which is configured to listen to a notification from a main processor; calling in the main processor a run-synergistic-processing-program function, which is configured to notify the synergistic processing program listener to run a synergistic processing program image, which is part of the program image and has been transferred to the local store of the synergistic processor; and running the synergistic processing program image by the synergistic processing program listener in response to receiving the notification.

According to another aspect of the present invention, there is provided a system for loading and running program images rapidly in a multi-processor system, comprising: a main program module running in a main processor, which module is configured to start in a synergistic processor a synergistic processing program listener; and the synergistic processing program listener running in the synergistic processor, which synergistic processing program listener is configured to listen to a notification from the main processor, wherein the main program module is further configured to call a run-synergistic-processing-program function, which is configured to notify the synergistic processing program listener to run a synergistic processing program image, which is part of the program image and has been transferred to the local store of the synergistic processor, and the synergistic processing program listener is further configured to run the synergistic processing program image in response to receiving the notification.

BRIEF DESCRIPTION OF THE DRAWINGS

The attached claims describe novel features believed to be characteristic of the present invention. However, the invention itself and its preferred embodiments, additional objects and advantages can be best understood by reference to the following detailed description of the illustrative embodiments when read in conjunction with the drawings, in which:

The embodiments of the present invention will be explained hereinafter. However, it should be understood that the present invention is not limited to the specific embodiments described herein. On the contrary, it is contemplated to implement and practice the present invention using any combination of the following features and elements, regardless of whether they involve different embodiments. Therefore, the following aspects, features, embodiments and advantages are only for illustration, and shall not be construed as elements or limitations of the appended claims, unless otherwise stated explicitly in the claims. The reference to features, advantages and similar language in the present specification does not imply that all or some of the features and advantages that can be realized using the present invention are in any single embodiment of the present invention. On the contrary, the language involving features and advantages should be construed as only meaning that the specific features, advantages, and characteristics described in association with an embodiment are contained in at least one embodiment of the present invention. In addition, a person skilled in the art can understand that the names of the modules, functions and parameters, etc. in the following description are only for the convenience of narration, and shall not be construed as limitation to the present invention.

The basic concept of the present invention is to lower the overhead of calling the function for creating a thread on the SPE, such as spe_create_thread, by reducing its calling times to only once for a huge program, in order to enhance performance.

In the following, the present invention will be described in respect to, for example, a development and running environment comprising a 64-bit PowerPC Linux® operating system for Cell BE and a standard Linux tool set (having a Linux extension supporting Cell BE) as well as a Cell BE software development toolkit (SDK). Obviously, the development and running environment is only an example, and a person skilled in the art can apply the present invention to any other development and running environment directed to the Cell BE architecture according to the following description.

Figure 1:
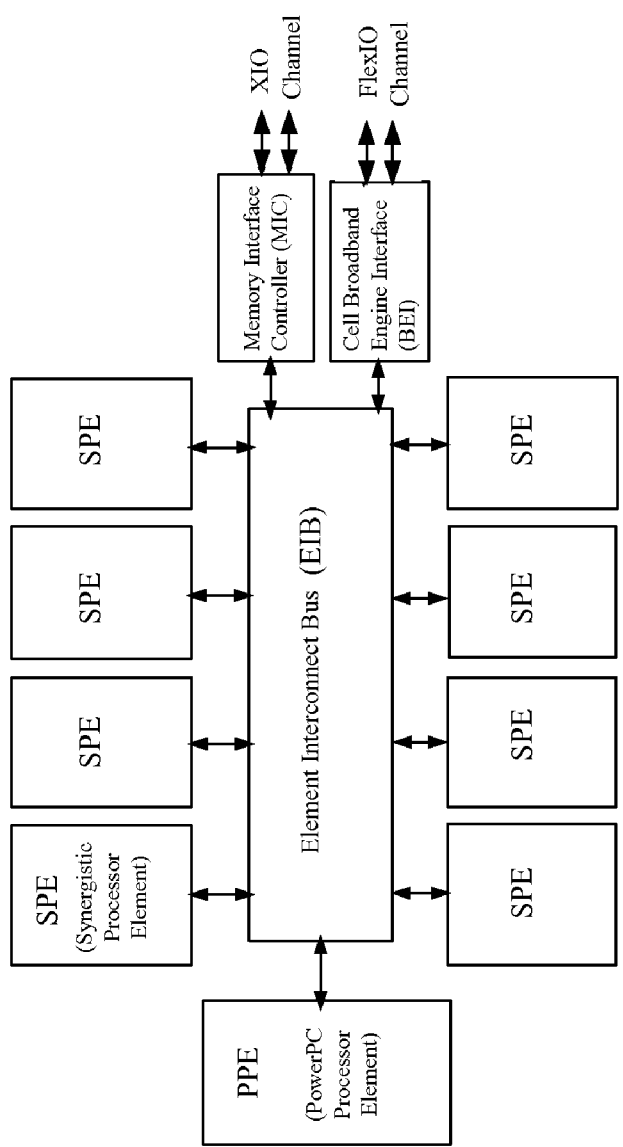
FIG. 1 is a block diagram of the structure of the Cell BE.
Figure 2:
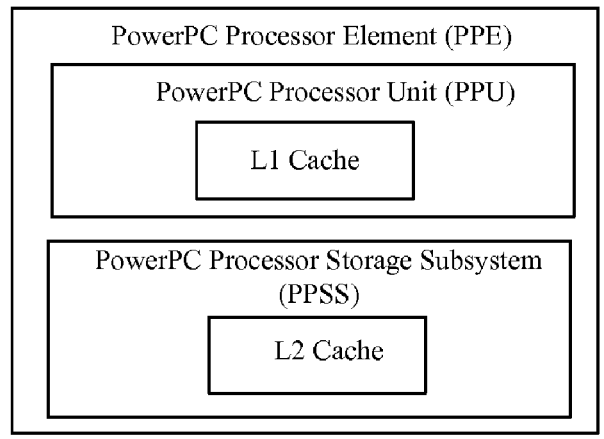
FIG. 2 is a block diagram of the structure of a PPE.
Figure 3:
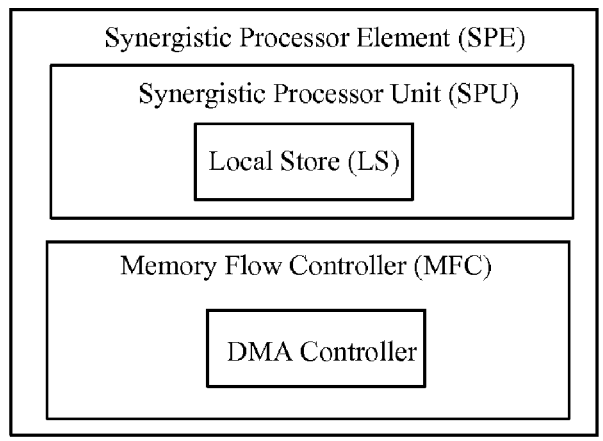
FIG. 3 is a block diagram of the structure of a SPE.
Figure 4:
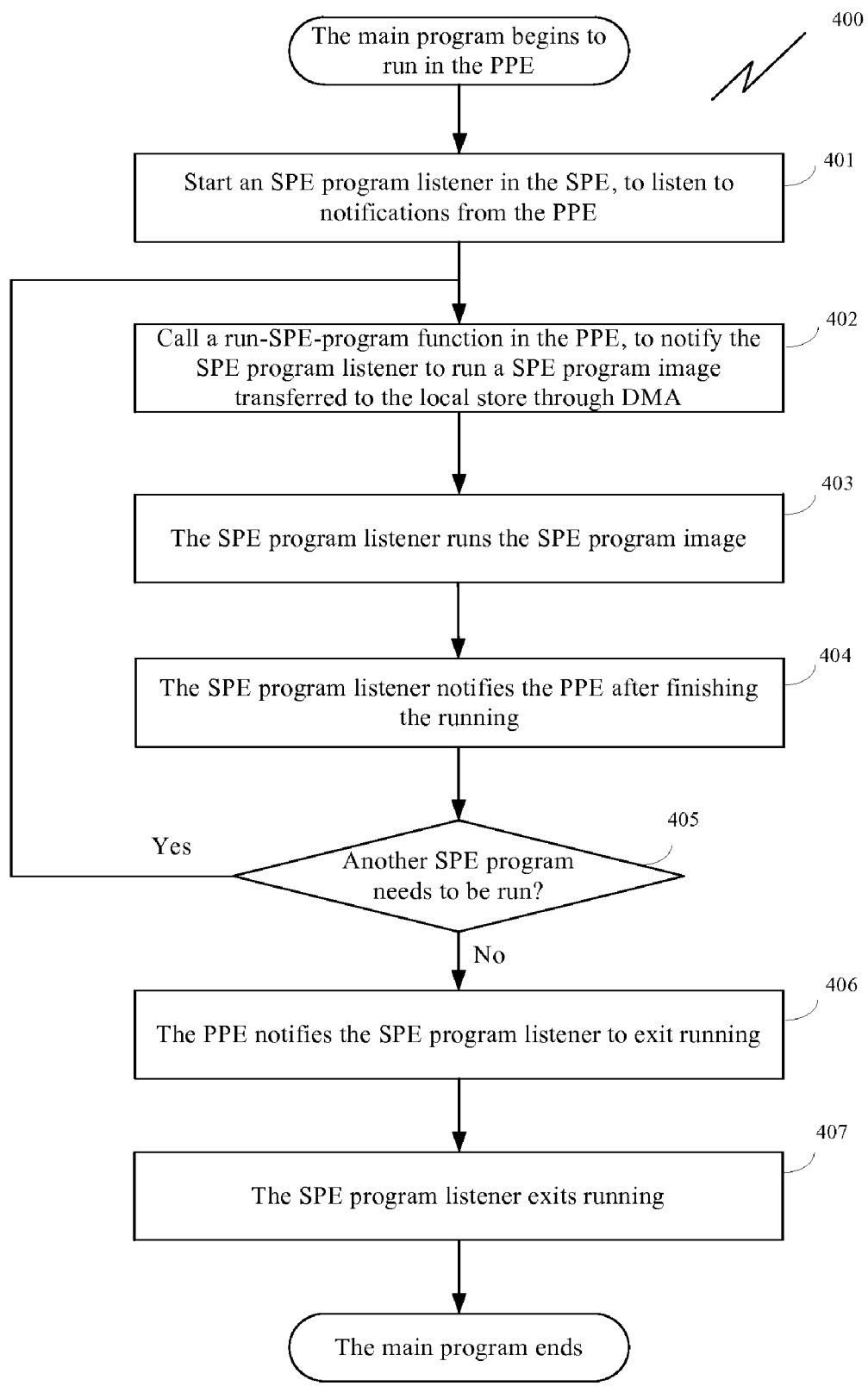
FIG. 4 shows a method for loading and running program images rapidly in CELL SPE according to an embodiment of the present invention.

FIG. 4 shows a method for loading and running program images rapidly in CELL SPE according to an embodiment of the present invention. As shown in the figure, the method comprises the following steps.

After the main program begins to run in the PPE, in step 401, a special SPE program called SPE program listener is started in the SPE. The spe_create_thread function call can be used to load and run the SPE program listener. The spe_create_thread function call will load the program image of the SPE program listener into the local store of the SPE from the main storage, set up a SPE environment, start the SPE program listener and return a pointer to the SPU's new thread ID.

The SPE program listener will continuously listen to any notifications from the PPE in runtime, so as to know whether the PPE needs the SPE to run a SPE program. The SPE program listener may listen to notifications from the PPE by reading the mailbox or signal notification register on the SPE. In an embodiment of the present invention, the SPE program listener only occupies a storage space of 400 bytes.

In step 402, a run-SPE-program function is called in the PPE, the run-SPE-program function being, for example, a PPE side library function run_spe_plugin. This function will load the SPE image needing to be run to the main storage from a permanent storage and transfer the SPE program image from the main storage to the SPE's local store through DMA, and then notify the SPU program listener to run this SPE image. Alternatively, the SPE program image was already loaded from the permanent storage to the main storage along with the main program image when the main program began to run. Thus, the run-SPE-program function only needs to transfer the SPE program image from the main storage to the local store of the SPE through DMA, and notify the SPE program listener to run the SPE image. As yet another alternative, the run-SPE-program function can also not be responsible for transferring the SPE program image from the main storage to the local store of the SPE through DMA, instead it notifies the SPE program listener to transfer the SPE program image from the main storage to the local store of the SPE through DMA and run the SPE program image.

The run-SPE-program function can notify the SPE program listener to run the SPE program image by writing a message into the mailbox of the SPE, thus the SPE program listener can receive the notification by reading the message in the mailbox. Alternatively, the run-SPEprogram function can also send a signal notification to the SPE program listener to notify it to run the SPE program image, thus the SPE program listener can obtain the notification by receiving the signal notification. The message or the signal notification can contain the execution start address of the SPE program image.

In step 403, the SPE program listener runs the SPE program image after receiving the notification.

In step 404, when the SPE program listener finishes running the SPE program image, it notifies the PPE. The SPE program listener can notify the PPE that the SPE program has finished running by writing a message in another mailbox of the SPE, thus the main program running in the PPE can know that the SPE program has finished running by reading the message in the SPE mailbox.

In step 405, when the main program running on the PPE receives the notification that the SPE program has finished running, it determines whether there is another SPE program image that needs to be run. If so, the run-SPE-program function will be called once again in the PPE so as to repeat the above process, loading the other SPE program image into the local store of the SPE through DMA and the SPE program listener running the other SPE program image.

The above process can be performed continually until all the SPE programs needing to run have finished running. Thus, when the main program on the PPE determines there is no SPE program needing to be run, in step 406, it can notify the SPE program listener to exit running by writing a message in the mailbox of the SPE or by way of signal notification. And in step 407, the SPE program listener can exit running after it receives the notification.

Then, the main program running on the PPE can run continually to the end.

In the above example, the steps of the method for loading and running program images rapidly in CELL SPE according to an embodiment of the present invention have been described. It should be noted that the described steps are only exemplary, and not limitation to the method of the present invention. The method of the present invention can have more, less or different steps.

In the following are presented exemplary pseudocodes of the functions or steps involved in the above process. It should be noted that these exemplary pseudocodes only illustrate an exemplary embodiment of the present invention, and not limitation to the present invention.

Exemplary pseudocode of the above step for starting the SPE program listener is as follows:

```
int start_plugin_listener(spe_program_handle handle)
{
call spe_create_thread to run a special SPE program plugin_listener
identified by handle;
return the ID of the SPE executing the plugin_listener program.
}
```

Exemplary pseudocode of the above run-SPE-program function is as follows:

```
int run_plugin(int id, spe_program_handle plugin)
{
    //id specifies a SPE
read a message from the mailbox of the SPE until the message is
IDLE_MESSAGE;
use DMA to place the program content into the local store of the SPE;
obtain the start address of the program, and fill it into EXECUTE_MES-
SAGE;
write the EXECUTE_MESSAGE into the mailbox of the SPE.
}
```

Exemplary pseudocode of the above step for notifying the SPE program listener to exit running is as follows:

```
int stop_plugin_listener(int id)
{
        write EXIT_MESSAGE into the mailbox of the SPE
    }
```

Exemplary pseudocode of the above SPE program listener plugin_listener executed at the SPE side (Synergistic Processor) is as follows:

```
int main( )
{
loop:
    read a message from the mailbox;
    if the message is EXIT_MESSAGE
        exit
    else if the message is EXECUTE_MESSAGE
        obtain the start address of the program;
        use an indirect call instruction to execute the program from the
start position;
        write IDLE_MESSAGE into the mailbox, which
indicates the SPE has finished execution of the program;
    goto loop
}
```

The PPE and SPE can write into the mailbox a 32-bit integer each time, and can specify the following three kinds of messages:

The left block indicates the upper 16 bits and the right block indicates the lower 16 bits. All the upper 16 bits of each of EXIT_MESSAGE and IDLE_MESSAGE are 0s. The upper 16 bits of EXECUTE_MESSAGE indicates the execution start address of the program.

| EXIT MESSAGE | |
|---|---|
| 0x000 | 0xDEAD |
| IDLE_MESSAGE | |
| 0x000 | 0xDDDD |
| EXECUTE_MESSAGE | |
| Start address | 0xEEEE |

Figure 5:
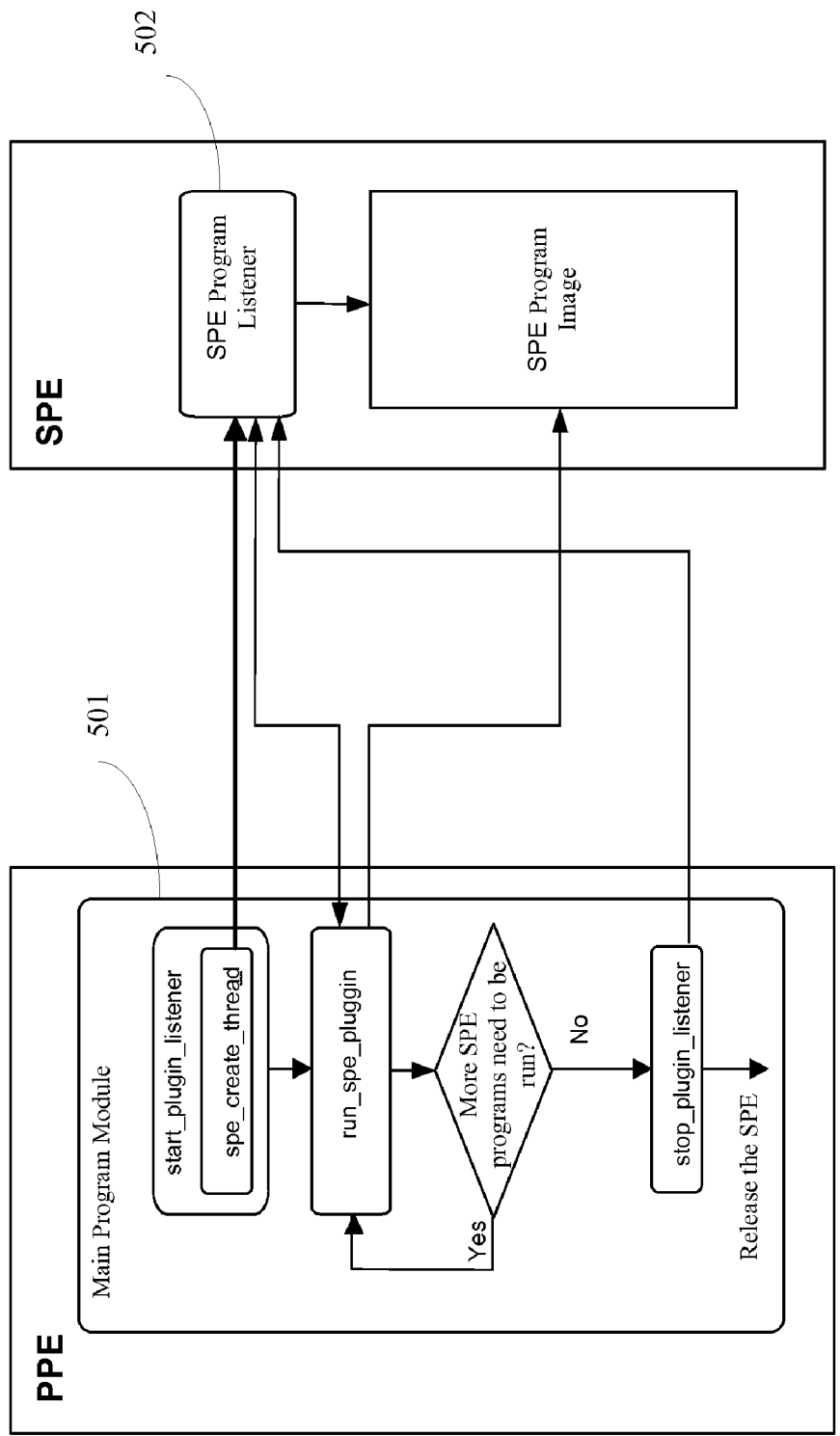
FIG. 5 shows a system for loading and running program images rapidly in CELL SPE according to an embodiment of the present invention.

A system for loading and running program images rapidly in CELL SPE according to an embodiment of the present invention will be described below with reference to FIG. 5. As shown in the figure, the system comprises a main program module 501 running in the PPE and a SPE program listener 502 running in the SPE.

The main program module 501 is configured to start the SPE program listener 502 in the SPE. For example, the main program module 501 can start the SPE program listener 502 by invoking a start_plugin_listener function. The start_plugin_listener function invokes a spe_create_thread function, and returns an ID representing the SPE running the SPE program listener 502. The spe_create_thread function sets a SPE environment, starts a new thread to run the SPE program listener 502, and returns a pointer to the thread ID of the SPE.

The SPE program listener 502 is configured to listen to notifications from the PPE. For example, the SPE program listener 502 can obtain notifications by reading the mailbox or the signal notification register of the SPE.

The main program module 501 is further configured to call a run-SPE-program function, such as run_spe_pluggin, this run-SPE-program function being configured to notify the SPE program listener 502 to run a SPE program image which is part of the program image and has been transferred to the local store of the SPE through DMA. And the SPE program listener 502 is further configured to run the SPE program image after receiving the notification.

The run-SPE-program function can be further configured to load the SPE program image to the main storage from a permanent storage. Of course, it is also possible that the main program module 501 loads the image of the main program together with the SPE program image from a permanent storage to the main storage when the main program begins to be executed.

In an embodiment of the present invention, the run-SPE-program function is further configured to transfer the SPE program image to the local store of the SPE through DMA, and notify the SPE program listener 502 to run the SPE program image. The SPE program listener 502 is configured to run the SPE program image after receiving a notification from the main program module 501.

In another embodiment of the present invention, the run-SPE-program function only notifies the SPE program listener 502 to load and run the SPE program image, and the SPE program listener 502 is configured to transfer the SPE program image to the local store of the SPE through DMA, and then execute the SPE program image, after receiving a notification from the run-SPE-program function.

The run-SPE-program function can be configured to notify the SPE program listener 502 to run the SPE program image by writing a message into a mailbox of the SPE, and can embed the start address for executing the SPE program image into the message. The SPE program listener 502 can obtain the notification by reading the message in the mailbox. Alternatively, the run-SPE-program function can be configured to notify the SPE program listener 502 to run the SPE program image by writing a message into the signal notification register of the SPE, and the SPE program listener 502 can obtain the notification by reading the message in the signal notification register.

The SPE program listener 502 is further configured to notify the main program module 501 after finishing running the SPE program image. The SPE program listener 502 can notify the main program module by writing another message into another mailbox of the SPE. Further, the main program module 501 is further configured to determine whether there is another SPE program image needing to be run when it receives the notification by reading the message in the mailbox, for example. If the determination is yes, then the main program module 501 further calls the run-SPE-program function in the PPE, so as to notify the SPE program listener 502 to run the other SPE program image which has been transferred to the local store of the SPE through DMA. In addition, the SPE program listener 502 is further configured to run the other SPE program image when receiving the notification.

The main program module 501 is further configured to notify in the PPE the SPE program listener 502 to exit running when finished running all the SPE programs; and the SPE program listener is further configured to exit running after receiving the notification of exiting from running, thus releasing the SPE in the PPE. The main program module 501 can notify the SPE program listener 502 to exit running by writing another message into the mailbox, and the SPE program listener 502 can obtain the notification of exiting from running by reading the message in the mailbox. The main program module 501 can also notify the SPE program listener 502 to exit running by writing information into the signal notification register, and the SPE program listener 502 can obtain the notification of exiting from running by reading the message in the signal notification register.

In the above, a system for loading and running program images rapidly in CELL SPE according to an embodiment of the present invention has been described. It should be noted that the system described herein is only an example, and not a limitation to the present invention. The system of the present invention can have more, less or different modules, and the containment and linking relationships among the modules can be different. In addition, the names of the modules are only for the convenience of narration, and do not imply any limitation to the present invention. For example, the above functions of the main program module 501 can also be implemented by a control module, and the control module can contain a module for starting the SPE program listener in a SPE, a module for running a SPE program in the SPE, a module for making the program listener exit running, and etc. All these variations fall within the spirit and scope of the present invention.

Compared with a SPE runtime management library, the performance improvement obtained using the method of the present invention is proportional to the calling times of the run-SPE-program function. A test indicates that the overhead of calling run_spe_plugin 4000 times is the same as that of calling spe_create_thread 100 times.

The following table shows the testing results. For a same program, assume that it should be loaded 1000 times into the SPE for running.

| Use the SPE program listener (Y/N) | Calling times of spe_create_thread | Calling times of run_spe_plugin | Overhead |
|---|---|---|---|
| N | 1000 | 0 | 120 sec |
| Y | 1 | 1000 | 3 sec |

It should be pointed out that, while the present invention has been described with respect to the Cell BE architecture, the present invention is not limited to the Cell BE architecture, and can be applied to other multiprocessor architectures such as the so-called non-uniform memory architecture (NUMA).

Therefore, the present invention further provides a method for loading and running program images rapidly in a multiprocessor system, comprising the steps of: starting in a synergistic processor a synergistic processing program listener, which is configured to listen to notifications from a main processor; calling in the main processor a run-synergistic-processing-program function which is configured to notify the synergistic processing program listener to run a synergistic processing program image which is part of the program image and has been transferred to the local store of the synergistic processor; and the synergistic processing program listener running the synergistic processing program image after it receives the notification.

In addition, the present invention also provides a system for loading and running program images rapidly in a multi-processor system, comprising: a main program module running in a main processor, which is configured to start in a synergistic processor a synergistic processing program listener; and the synergistic processing program listener running in a synergistic processor configured to listen to notifications from the main processor, wherein the main program module is further configured to call a run-synergistic-processing-program function which is configured to notify the synergistic processing program listener to run a synergistic processing program image which is part of the program image and has been transferred to the local store of the synergistic processor, and the synergistic processing program listener is further configured to run the synergistic processing program image after receiving the notification.

The present invention can be realized in hardware, software, firmware or a combination thereof. A typical combination of hardware and software is a computer system having a computer program, which, when being loaded and executed, controls the computer system to enable the computer system to execute the methods described herein, and to form the functional modules of the system of the present invention. The present invention can be further embedded in a computer program product which comprises all the features enabling the realization of the methods described herein, and when being loaded into a computer system can carry out the methods.

While the present invention has been shown and described with respect to the preferred embodiments particularly, a person skilled in the art can understand that various changes in form and detail can be made thereto without departing from the spirit and scope of the present invention.

The invention claimed is:

1. A method for loading and running program images in a multi-processor system, comprising:
   calling a synergistic-processor-create-thread function, the synergistic-processor-create-thread function configured at least to load a synergistic processing program listener into a local store of a synergistic processor, to set up a synergistic processor environment, and to create a thread on the synergistic processor, wherein the synergistic-processor-create-thread function only needs to be called once to run all synergistic processing program images of the thread on the synergistic processor;
   starting the synergistic processing program listener in the synergistic processor, the synergistic processing program listener configured to listen for at least one notification from a main processor;
   receiving a particular notification of the at least one notification from the main processor, the particular notification being a notification to run a particular synergistic processing program image;
   running the particular synergistic processing program image from the local store of the synergistic processor upon receiving the particular notification; notifying the main processor upon running the particular synergistic processing program image; and
   continuously listening for a subsequent notification from the main processor, the subsequent notification being at least one of a notification to run a subsequent synergistic processing program image or an exit notification to exit the synergistic processing program listener.

2. The method according to claim 1, wherein the multi-processor system is a Cell Broadband Engine, the main processor is a Cell Power Processor Element (PPE), the synergistic processor is a Cell Synergistic Processor Element (SPE), the synergistic processing program listener is a SPE program listener, particular synergistic processing program image is a SPE program image, and the SPE program image is transferred to the local store of the SPE through direct memory access (DMA).

3. The method according to claim 2, wherein the SPE program image is transferred to the local store of the SPE by a run-SPE-program function of the main processor through DMA.

4. The method according to claim 2, wherein the SPE program image is transferred to the local store of the SPE by the SPE program listener upon receiving the particular notification.

5. The method according to claim 1, further comprising:
   receiving a subsequent particular notification of the at least one notification from the main processor, the subsequent particular notification being a notification to run a subsequent particular synergistic processing program image;
   running the subsequent particular synergistic processing program image from the local store of the synergistic processor upon receiving the subsequent particular notification; and
   notifying the main processor upon running the subsequent particular synergistic processing program image.

6. The method according to claim 1, further comprising:
   receiving a last particular notification of the at least one notification from the main processor, the last particular notification being a notification to run a last particular synergistic processing program image;
   running the last particular synergistic processing program image from the local store of the synergistic processor upon receiving the last particular notification;
   notifying the main processor upon running the last particular synergistic processing program image;
   receiving the exit notification from the main processor; and
   exiting the synergistic processing program listener.

7. The method according to claim 1, wherein the particular notification further comprises a message written in a mailbox of the synergistic processor.

8. The method according to claim 1, wherein the particular notification is received as a signal.

9. The method according to claim 1, wherein notifying the main processor upon running the particular synergistic processing program image further includes:
   writing a message into a mailbox of the synergistic processor, wherein the message is to be read by the main processor.

10. The method according to claim 1, further comprising:
    exiting the synergistic processing program listener,
    wherein between starting and exiting, all synergistic processing program images needed to be run are run without additional setup of the synergistic processor environment.

11. A system for loading and running program images in a multi-processor system, comprising:
    a main processor in communication with a synergistic processor, the main processor including a main program module at least configured to:
    call a synergistic-processor-create-thread function, the synergistic-processor-create-thread function configured at least to load a synergistic processing program listener into a local store of the synergistic processor, to set UP a synergistic processor environment, and to create a thread on the synergistic processor, wherein the synergistic-processor-create-thread function only needs to be called once to run all synergistic processing program images of the thread on the synergistic processor;
start the synergistic processing program listener in the synergistic processor; and
call a run-synergistic-processing-program function to notify the synergistic processing program listener to run a particular synergistic processing program image; and
the synergistic processor, the synergistic processor including the synergistic processing program listener at least configured to:
receive a particular notification from the main processor, the particular notification being a notification to run the particular synergistic processing program image;
run the particular synergistic processing program image from the local store of the synergistic processor upon receiving the particular notification;
notify the main processor upon running the particular synergistic processing program image; and
continuously listen for a subsequent notification from the main processor, the subsequent notification being at least one of a notification to run a subsequent synergistic processing program image or an exit notification to exit the synergistic processing program listener.

12. The system according to claim 11, wherein the multi-processor system is a Cell Broadband Engine, the main processor is a Cell Power Processor Element (PPE), the synergistic processor is a Cell Synergistic Processor Element (SPE), the synergistic processing program listener is a SPE program listener, the run-synergistic-processing-program function is a run-SPE-program function, the particular synergistic processing program image is a SPE program image, and the SPE program image is transferred to the local store of the SPE through direct memory access (DMA).

13. The system according to claim 12, wherein the run-SPE-program function is further configured to transfer the SPE program image to the local store of the SPE through DMA.

14. The system according to claim 12, wherein the SPE program image is transferred to the local store of the SPE by the SPE program listener upon receiving the particular notification.

15. The system according to claim 11, wherein the main program module is further configured to:
receive a notification from the synergistic processing program listener after the synergistic processing runs the particular synergistic processing program image;
determine that a subsequent particular synergistic processing program image needs to be run by the synergistic processing program listener upon receiving the notification; and
subsequently call the run-synergistic-processing-program function to subsequently notify the synergistic processing program listener to run the subsequent particular synergistic processing program image; and
the synergistic processing program listener is further configured to:
receive a subsequent particular notification from the main processor, the subsequent particular notification being a notification to run the subsequent particular synergistic processing program image;
run the subsequent particular synergistic processing program image from the local store of the synergistic processor upon receiving the subsequent particular notification; and notify the main processor upon running the subsequent particular synergistic processing program image.

16. The system according to claim 11, wherein, the main program module is further configured to:
receive a notification from the synergistic processing program listener after the synergistic processing runs the particular synergistic processing program image;
determine that a subsequent particular synergistic processing program image does not need to be run by the synergistic processing program listener upon receiving the notification; and
notify the synergistic processing program listener to exit; and
the synergistic processing program listener is further configured to:
receive the exit notification from the main processor; and
exit.

17. The system according to claim 11, wherein the run-synergistic-processing-program function is configured to notify the synergistic processing program listener to run the particular synergistic processing program image by writing a message in a mailbox of the synergistic processor, and the synergistic processing program listener is configured to receive the notification by reading the message in the mailbox.

18. The system according to claim 11, wherein the run-synergistic-processing-program function is configured to notify the synergistic processing program listener to run the synergistic processing program image by sending a signal notification to the synergistic processor, and the synergistic processing program listener receives the particular notification by receiving the signal notification.

19. The system according to claim 11, wherein the synergistic processing program listener is configured to notify the main program module on the main processor after running the synergistic processing program image by writing a message into a mailbox of the synergistic processor, and the main program module on the main processor receives the notification by reading the message in the mailbox of the synergistic processor.

20. A method for creating a thread in a multi-processor system, comprising:
calling a synergistic-processor-create-thread function;
loading a synergistic processing program listener into a local store of a synergistic processor of the multi-processor system, the synergistic processing program listener at least configured to continuously listen for one or more notifications from a main processor of the multi-processor system, the one or more notifications being at least one of a notification to run a synergistic processing program image or an exit notification to exit the synergistic processing program listener;
setting up a synergistic processor environment upon the loading of the synergistic processing program listener into the local store of the synergistic processor of the multi-processor system; and
creating a thread on the synergistic processor upon the setting UP of the synergistic processor environment,
wherein the synergistic-processor-create-thread function only needs to be called once to run all synergistic processing program images of the thread on the synergistic processor.

* * * * *